(12) United States Patent
Satake et al.

(10) Patent No.: US 8,023,785 B2
(45) Date of Patent: Sep. 20, 2011

(54) LASER GUIDE OPTICAL FIBER AND LASER GUIDE INCLUDING THE SAME

(75) Inventors: Takeshi Satake, Hyogo (JP); Takeji Akutsu, Hyogo (JP); Motohiko Yamasaki, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 246 days.

(21) Appl. No.: 12/531,788

(22) PCT Filed: Mar. 10, 2008

(86) PCT No.: PCT/JP2008/000522
§ 371 (c)(1),
(2), (4) Date: Sep. 17, 2009

(87) PCT Pub. No.: WO2008/117517
PCT Pub. Date: Oct. 2, 2008

(65) Prior Publication Data
US 2010/0111474 A1   May 6, 2010

(30) Foreign Application Priority Data
Mar. 27, 2007   (JP) ................... 2007-081406

(51) Int. Cl.
*G02B 6/26* (2006.01)
(52) U.S. Cl. ............... 385/38; 385/14; 385/49; 385/88; 385/96; 385/98; 385/99
(58) Field of Classification Search .......... 385/14, 385/31, 33, 34, 49, 38, 88, 89, 92, 93, 94, 385/95, 96, 97, 98, 99, 140; 65/385, 386, 65/406, 412
See application file for complete search history.

(56) References Cited

U.S. PATENT DOCUMENTS

| | | | | |
|---|---|---|---|---|
| 5,080,962 A | * | 1/1992 | Hench | 428/218 |
| 5,371,818 A | * | 12/1994 | Presby | 385/49 |
| 5,422,975 A | * | 6/1995 | Kanamori et al. | 385/140 |
| 6,411,759 B1 | * | 6/2002 | Beguin et al. | 385/49 |
| 6,424,765 B1 | * | 7/2002 | Harker | 385/31 |
| 6,760,112 B2 | * | 7/2004 | Reed et al. | 356/477 |

(Continued)

FOREIGN PATENT DOCUMENTS

JP   55-012948   1/1980
(Continued)

OTHER PUBLICATIONS

International Search Report for corresponding Application No. PCT/JP2008/000522 mailed Apr. 1, 2008.

(Continued)

*Primary Examiner* — Brian Healy
(74) *Attorney, Agent, or Firm* — Renner, Otto, Boisselle & Sklar, LLP (57) ABSTRACT

A laser guide optical fiber (100) used for transmitting a laser beam includes an optical fiber body (110) including a core (111) and a clad (112), and a quartz chip (120) integrally provided at an end surface on the light entering side of the optical fiber body (110) and including an optical waveguide portion, where at least the optical waveguide portion of the quartz chip (120) is made of pure quartz. The quartz chip (120) includes a light entering surface subjected to surface fusion treatment.

8 Claims, 5 Drawing Sheets

U.S. PATENT DOCUMENTS

| | | | |
|---|---|---|---|
| 2001/0036349 A1* | 11/2001 | Abe et al. | 385/124 |
| 2005/0180695 A1* | 8/2005 | Bronstein et al. | 385/49 |
| 2010/0111474 A1* | 5/2010 | Satake et al. | 385/38 |
| 2010/0310212 A1* | 12/2010 | Yamasaki et al. | 385/72 |

FOREIGN PATENT DOCUMENTS

| | | |
|---|---|---|
| JP | 55-071644 | 5/1980 |
| JP | 59-007324 | 1/1984 |
| JP | 61-191544 | 8/1986 |
| JP | 04-313711 | 11/1992 |
| JP | 05-196847 | 8/1993 |
| JP | 6-16914 | 3/1994 |
| JP | 06-190705 | 7/1994 |
| JP | 2001-221921 | 8/2001 |
| JP | 2003-035843 | 2/2003 |
| JP | 2004-302292 | 10/2004 |
| JP | 2004-325948 | 11/2004 |
| JP | 2005-303166 | 10/2005 |
| JP | 2006-009811 | 1/2006 |

OTHER PUBLICATIONS

Form PCT/ISA/237.

* cited by examiner

LASER GUIDE OPTICAL FIBER AND LASER GUIDE INCLUDING THE SAME

TECHNICAL FIELD

The present disclosure relates to laser guide optical fibers used for transmitting laser beams, and laser guides including such fibers.

BACKGROUND ART

A laser guide includes a laser guide optical fiber covered with a buffer layer and a covering layer, optical connectors attached to the opposite ends of the laser guide optical fiber subjected to cutting and end surface polishing, a protection pipe covering the laser guide optical fiber, and other accessories. The laser guide optical fibers include SI type optical fibers including cores made of pure quartz glass and GI type optical fibers including cores made of quartz glass doped with germanium (Ge).

Patent Document 1 discloses a laser guide optical fiber including a core at its central portion and a clad at the outer periphery of the core, where an end surface of the optical fiber is joined to one end surface of a coreless fiber made of substantially the same material as the material of the core and having a uniform refractive index. In the optical fiber, the length of the optical path of the coreless fiber is set to be less than 1 mm so that the diameter of the beam when light transmitted through the core of the optical fiber spreads in the coreless fiber and is emitted outside from the other end surface of the coreless fiber is equal to or smaller than the outer diameter of the coreless fiber. The other end surface of the coreless fiber has a concave shape having a center of curvature on the optical axis of the optical fiber. Further, the outer diameter of the optical fiber is different from the outer diameter of the coreless fiber.

Patent Document 2 discloses that a joint end portion of a PC fiber is melted by heat treatment to form a sealing portion that seals pores of the clad, and the length L of the sealing portion is set according to calculation from the incident angle θ of signal light to the PC fiber, the outer diameter D of the fiber, the core diameter a of the fiber, the refractive index n of the sealing portion, and the like.

Patent Document 3 discloses a configuration of an optical fiber in which a coreless fiber is melted and joined to the light emitting surface of the optical fiber, and a covering material having a refractive index higher than that of the coreless fiber is provided around the coreless fiber.

Patent Document 1: Japanese Unexamined Patent Application Publication No. 2004-302292
Patent Document 2: Japanese Unexamined Patent Application Publication No. 2004-325948
Patent Document 3: Japanese Unexamined Patent Application Publication No. 2005-303166

SUMMARY

A laser guide optical fiber according to the present invention is used for transmitting a laser beam, and includes: an optical fiber body including a core and a clad; and a quartz chip integrally provided at an end surface on a light entering side of the optical fiber body and including an optical waveguide portion, where at least the optical waveguide portion of the quartz chip is made of pure quartz, wherein the quartz chip includes a light entering surface subjected to surface fusion treatment.

A laser guide according to the present invention is a laser guide where the laser guide optical fiber of the present invention is inserted through a flexible tube, and optical connectors are attached to opposite ends of the laser guide optical fiber.

BEST MODE FOR CARRYING OUT THE INVENTION

Example embodiments will be described below with reference to the accompanying drawings.

Example Embodiment 1

Figure 1:
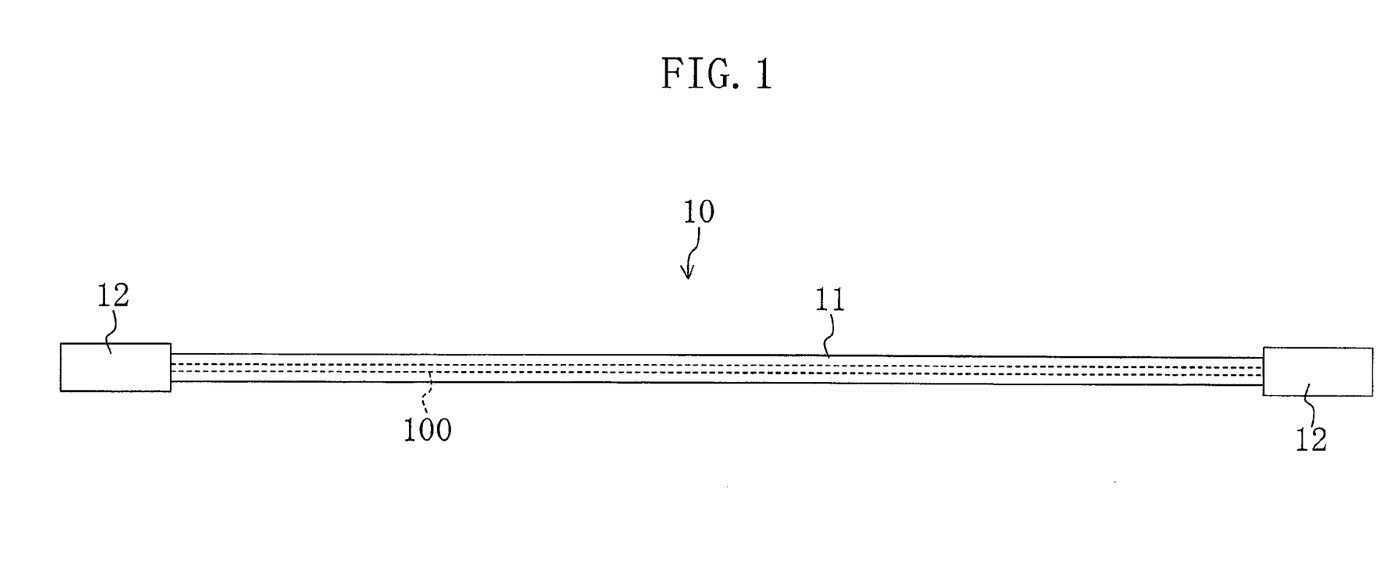
FIG. 1 is a side view of a laser guide according to Example Embodiment 1.

FIG. 1 shows a laser guide 10 according to Example Embodiment 1.

The laser guide 10 is used as a waveguide for transmitting a laser beam in laser surgical knives in the medical field and laser processing tools in the field of mechanical processing.

In the laser guide 10, a laser guide optical fiber 100 is inserted through a flexible tube 11, such as a SUS pipe, and metal optical connectors 12 are attached to the opposite ends of the laser guide optical fiber 100.

Figure 2:
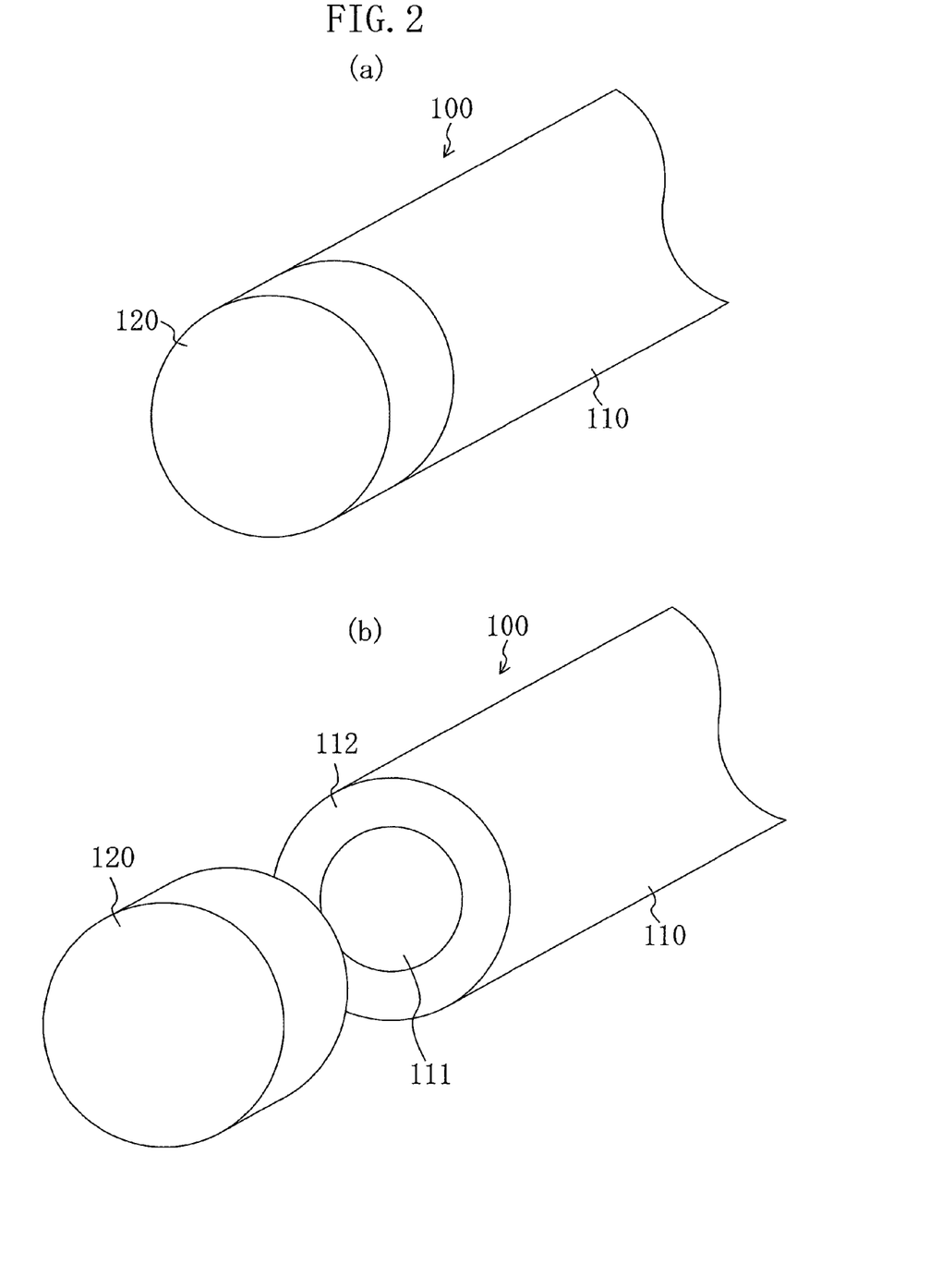
FIGS. 2(a) and 2(b) are a perspective view and an exploded perspective view, respectively, of a laser guide optical fiber according to Example Embodiment 1.

FIGS. 2(a) and 2(b) shows the laser guide optical fiber 100 according to Example Embodiment 1.

The laser guide optical fiber 100 includes an optical fiber body 110 and a quartz chip 120 integrated by being fused with the end surface on the light entering side of the optical fiber body 110.

The optical fiber body 110 is made of quartz glass, and includes a core 111 at the center of the fiber and a clad 112 covering the core 111. The optical fiber body 110 has a fiber length of 100 mm to 1000 m, a fiber diameter of 125 to 2500 μm, and a core diameter of 10 to 2000 μm, for example.

The optical fiber body 110 may be an SI type optical fiber in which the core 111 is made of pure quartz glass, or a GI type optical fiber in which the core 111 is made of quartz glass doped with germanium (Ge).

In the former case, the clad 112 is made of quartz glass doped with fluorine (F), boron (B), or the like to have a refractive index lower than that of the core 111. The refractive index of the core 111 is 1.45 to 1.46. The refractive index of the clad 112 is 1.42 to 1.45. The numerical aperture (NA) is 0.1 to 0.3.

In the latter case, the clad 112 is made of pure quartz glass or quartz glass doped with fluorine (F), boron (B), or the like to have a refractive index lower than that of the core 111. The refractive index of the core 111 is 1.45 to 1.50. The refractive index of the clad 112 is 1.42 to 1.45. The numerical aperture (NA) is 0.1 to 0.5.

The quartz chip 120 is made of pure quartz glass only, and has a disk shape having substantially the same diameter as the fiber diameter of the optical fiber body 110. The quartz chip 120 has a thickness of 50 to 2000 μm, for example. The end surface of the quartz chip 120 where light enters is subjected to surface fusion treatment to be smooth.

Next, a method for manufacturing the laser guide optical fiber 100 will be described with reference to FIGS. 3(a) and 3(b).

Figure 3:
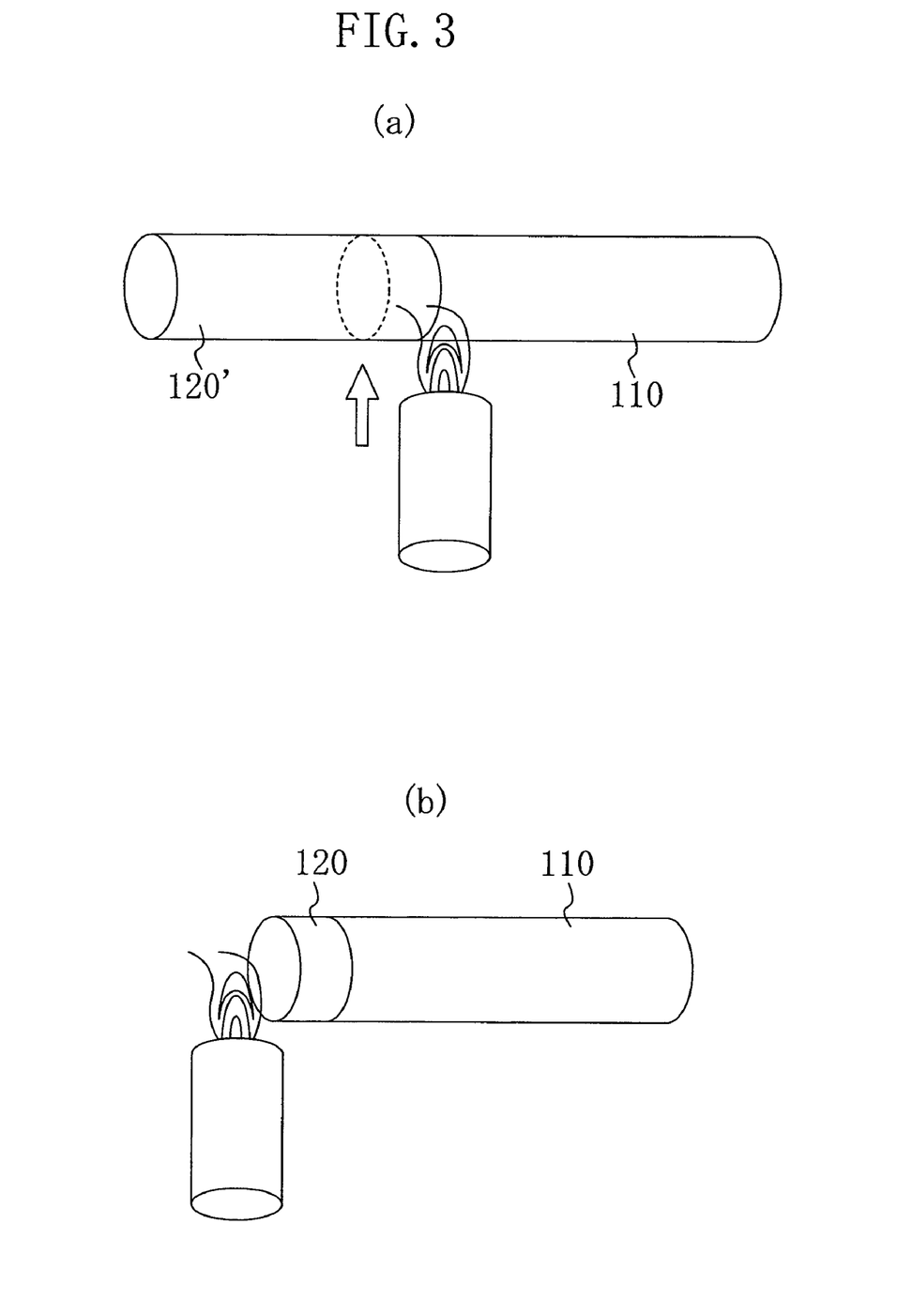
FIGS. 3(a) and 3(b) are illustrations showing a method for manufacturing the laser guide optical fiber according to Example Embodiment 1.

First, as shown in FIG. 3(a), the end surface on the light entering side of the optical fiber body 110 is made to abut on one end surface of a quartz fiber 120' made of pure quartz glass only, and the abutting portion is heated and melted with a burner or the like, thereby fusing and integrating them with each other.

Next, a notch is formed at a point of the quartz fiber 120' a predetermined distance apart from the fused portion, and the quartz fiber 120' is cut at the notch to cut out the quartz chip 120 (see the broken portion in FIG. 3(a)).

Subsequently, as shown in FIG. 3(b), flame of a burner or the like is applied to or a $CO_2$ laser beam or the like is irradiated to the end surface of the quartz chip 120, which is a light entering surface, for surface fusion treatment, thereby smoothing the surface. Polishing treatment may be performed before this surface fusion treatment.

This laser guide optical fiber 100 is used as an optical fiber core wire including the optical fiber body 110 covered with a buffer layer and a covering layer. The laser guide optical fiber 100 is inserted through the flexible tube 11. The optical connectors 12 are attached to the opposite ends of the laser guide optical fiber 100. Then, other accessories are attached, thereby completing a laser guide 10.

The laser guide optical fiber 100 receives, at the light entering surface of the quartz chip 120, a laser beam collected from a light source. The laser beam passes through the quartz chip 120. Then, the core 111 of the optical fiber body 110 receives and transmits the laser beam whose optical power density is increased. Accordingly, the thickness of the quartz chip 120 is determined with the numerical aperture (NA) of the optical fiber body 110 and the like taken into consideration so that all the received laser beam can be collected and enter the core 111 of the optical fiber body 110.

Recently, output powers of lasers as light sources have been increased, and applications in which laser guide optical fibers are required to have smaller core diameters have been increased. In association with an increase in output powers of light sources and a reduction in core diameters of laser guide optical fibers or in spot diameters, the optical densities of the laser beams increase. This may damage the end surfaces of the laser guide optical fibers. The end surfaces of the laser guide optical fibers, which may be influenced by the magnetic field inside the fibers and stain by polishing, have low durability against laser beams in general. In particular, a strong tendency of such a type is exhibited by the laser guide optical fibers of GI type optical fibers including cores made of quartz glass doped with germanium (Ge).

However, in the laser guide optical fiber 100 configured as above, the quartz chip 120 made of pure quartz glass is provided integrally on the light entering side of the optical fiber body 110, and the smooth light entering surface of the quartz chip 120 subjected to surface fusion treatment receives light. Accordingly, the light durability of the end surface on the light entering side can be increased. Further, the spot diameter at the end surface can be increase, thereby suppressing damage to the end surface on the light entering side.

Example Embodiment 2

Figure 4:
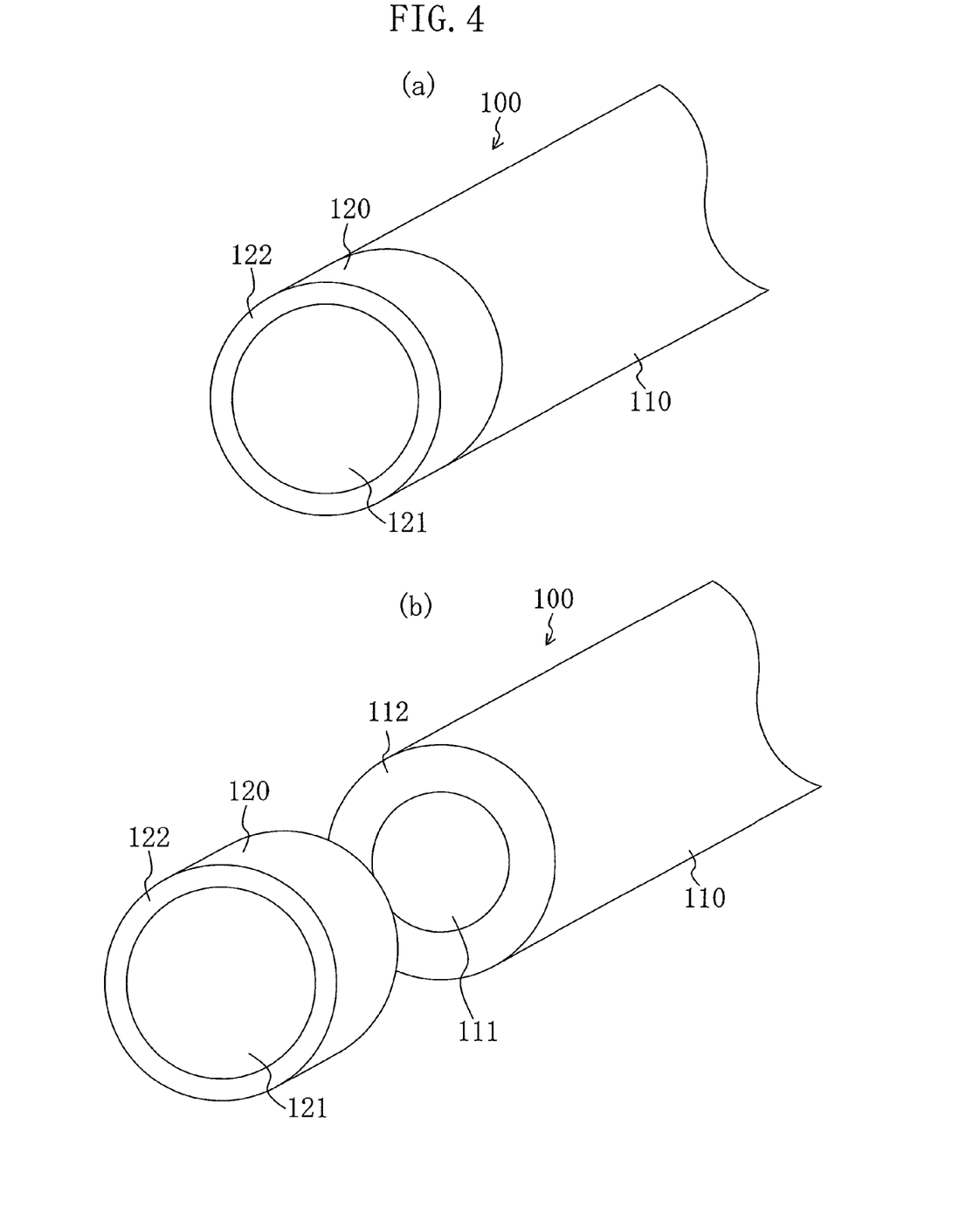
FIGS. 4(a) and 4(b) are a perspective view and an exploded perspective view, respectively, of a laser guide optical fiber according to Example Embodiment 2.

FIGS. 4(a) and 4(b) show a laser guide optical fiber 100 according to Example Embodiment 2. The same reference characters are assigned to the same elements as those in Example Embodiment 1.

The laser guide optical fiber 100 includes an optical fiber body 110 and a quartz chip 120 integrated by being fused with the end surface on the light entering side of the optical fiber body 110.

The quartz chip 120 is formed with an SI type optical fiber including a core 121 at the center of the fiber and a clad 122 covering the core 121. The quartz chip 120 is in a disk shape having substantially the same diameter as the fiber diameter of the optical fiber body 110. In the quartz chip 120 of an SI type optical fiber, the core 121 is made of pure quartz glass, and has a core diameter larger than the core 111 of the optical fiber body 110. The clad 122 is made of quartz glass doped with fluorine (F), boron (B), or the like to have a refractive index lower than that of the core 121. The quartz chip 120 has a core diameter of 125 to 2500 mm and a thickness of 50 to 2000 μm, for example. The refractive index of the core 121 is 1.45 to 1.46. The refractive index of the clad 122 is 1.42 to 1.45. The numerical aperture (NA) is 0.1 to 0.3. The quartz chip 120 has a light entering surface, which is subjected to surface fusion treatment to be smooth.

This laser guide optical fiber 100 is used as an optical fiber core wire including the optical fiber body 110 covered with a buffer layer and a covering layer. The laser guide optical fiber 100 is inserted through the flexible tube 11. The optical connectors 12 are attached to the opposite ends of the laser guide optical fiber 100. Then, other accessories are attached, thereby completing a laser guide 10.

The laser guide optical fiber 100 receives, at the light entering surface of the quartz chip 120, a laser beam collected from a light source. The laser beam passes through the quartz chip 120. Then, the core 111 of the optical fiber body 110 receives and transmits the laser beam whose optical power density is increased. Accordingly, the thickness of the quartz chip 120 is determined with the numerical apertures (NA) of the quartz chip 120 and the optical fiber body 110 and the like taken into consideration so that all the received laser beam can be collected and enter the core 111 of the optical fiber body 110.

The configuration of the other parts, the manufacturing method, and the advantages are the same as those in Example Embodiment 1.

Example Embodiment 3

Figure 5:
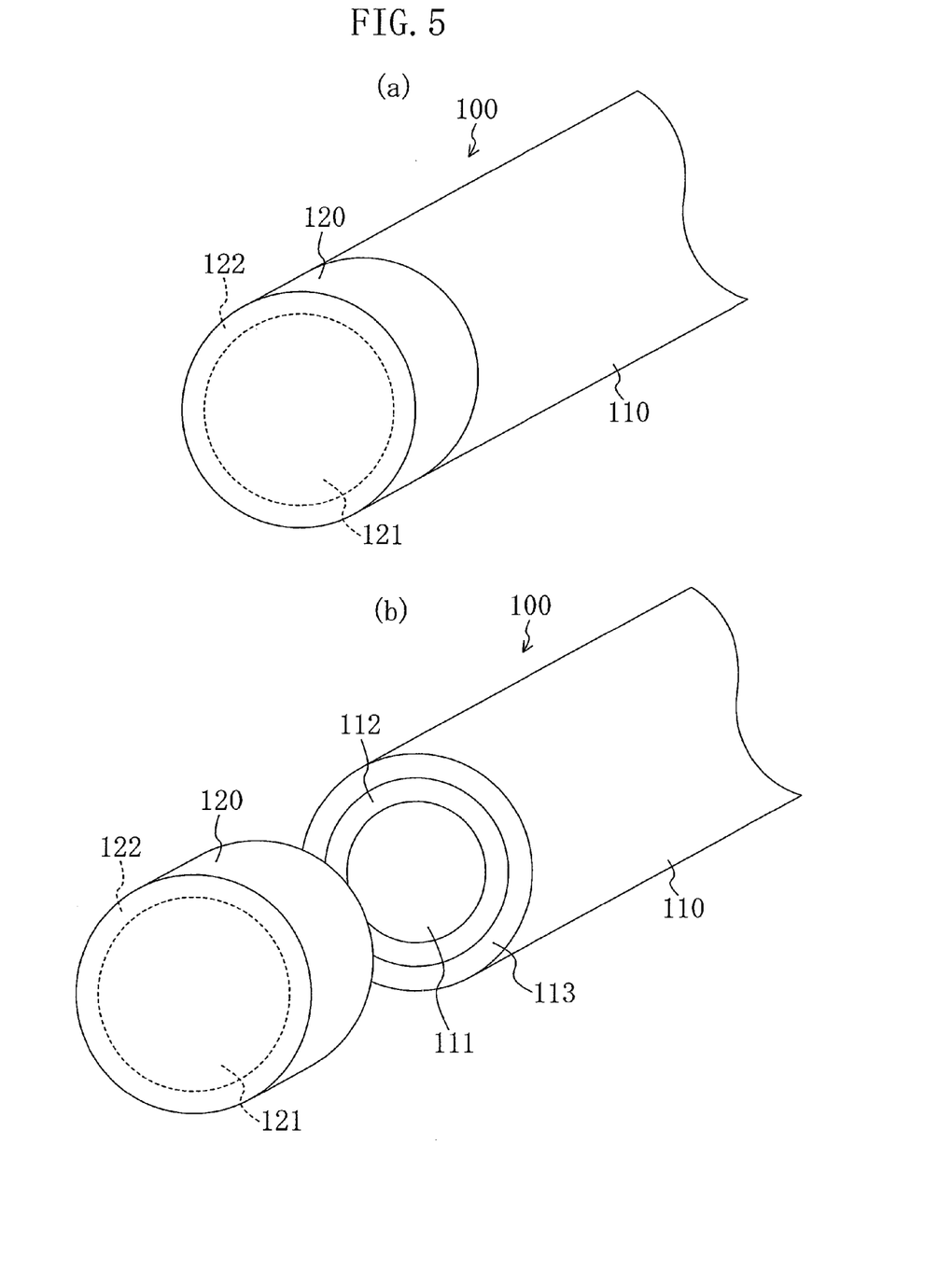
FIGS. 5(a) and 5(b) are a perspective view and an exploded perspective view, respectively, of a laser guide optical fiber according to Example Embodiment 3.

FIGS. 5(a) and 5(b) show a laser guide optical fiber 100 according to Example Embodiment 3. The same reference characters are assigned to the same elements as those in Example Embodiment 1.

The laser guide optical fiber 100 includes an optical fiber body 110 and a quartz chip 120 integrated by being fused with the end surface on the light entering side of the optical fiber body 110.

The optical fiber body 110 is made of quartz glass, and includes a core 111 at the center of the fiber, a clad 112 covering the core 111, and a support layer 113 covering the clad 112. The optical fiber body 110 has a fiber length of 100 mm to 1000 m, a fiber diameter of 125 to 2500 μm, a core diameter of 10 to 2000 μm, and a clad diameter of 11 to 2400 μm, for example. The support layer 113 is made of pure quartz glass, for example.

The quartz chip 1120 may be the same as that in Example Embodiment 1 or Example Embodiment 2.

The configuration of the other parts, the manufacturing method, and the advantages are the same as those in Example Embodiment 1.

(Evaluation 1)

Example 1

A laser guide optical fiber was prepared in a manner that a disk-shaped quartz chip having an outer diameter of 600 μm and a thickness of 1 mm and made of pure quartz glass only was fused and integrated with the end surface on the light entering side of an optical fiber body formed with an GI type optical fiber (core: germanium doped quartz glass having refractive index of 1.48, clad: BF doped quartz glass having a refractive index of clad: 1.44) having a fiber diameter of 600 μm and a core diameter of 400 μm, and the light entering surface of the quartz chip was subjected to surface fusion treatment. Then, optical connectors were attached to this laser guide optical fiber. When a YAG laser beam having a pulse frequency of 10 pps and a pulse width of 1 msec entered, the end surface on the light entering side of the laser guide optical fiber was not significantly damaged even after irradiation of 10000 pulses. The YAG laser beam had 95% laser power density of the threshold value of the laser power density of a single-pulse YAG laser beam whose irradiation can damage an end surface of an optical fiber body.

Comparative Example 1

In Example 1, a laser guide optical fiber was formed with only the optical fiber body with no quartz chip provided, and the optical connectors were attached to this laser guide optical fiber. When the same YAG laser beam entered this laser guide optical fiber, the end surface on the light entering side of the laser guide optical fiber was broken at the initial stage.

(Evaluation 2)

Example 2

A laser guide optical fiber was prepared in a manner that a disk-shaped quartz chip having a thickness of 1.5 mm and formed with an SI type optical fiber (core: pure quartz glass, clad: BF doped quartz glass having a refractive index of 1.44) having a fiber diameter of 600 μm and a core diameter of 400 μm was fused and integrated with the end surface on the light entering side of an optical fiber body formed with a GI type optical fiber (core: germanium doped quartz glass having a refractive index of 1.48, clad: BF doped quartz glass having a refractive index of 1.44) having a fiber diameter of 600 μm and a core diameter of 400 μm, and the light entering surface of the quartz chip was subjected to surface fusion treatment. Then, optical connectors were attached to this laser guide optical fiber. When a YAG laser beam having a pulse frequency of 10 pps and a pulse width of 1 msec entered the laser guide optical fiber to the amount of 8.08 J, a laser output of 7.36 J was obtained from the light emitting surface.

Comparative Example 2

In Example 2, a laser guide optical fiber was formed with only the optical fiber body with no quartz chip provided, and the optical connectors were attached to this laser guide optical fiber. When a YAG laser beam having a pulse frequency of 10 pps and a pulse width of 1 msec entered the laser guide optical fiber to the amount of 1 J, the end surface on the light entering side of the laser guide optical fiber was broken.

Example 3

A laser guide optical fiber was prepared in a manner that a disk-shaped quartz chip having a thickness of 1.5 mm and formed with an SI type optical fiber (core: pure quartz glass, clad: BF doped quartz glass having a refractive index of 1.44) having a fiber diameter of 600 μm and a core diameter of 400 μm was fused and integrated with the end surface on the light entering side of an optical fiber body formed with an SI type optical fiber (core: pure quartz glass, clad: BF doped quartz glass having a refractive index of 1.44) having a fiber diameter of 600 μm and a core diameter of 200 μm, and the light entering surface of the quartz chip was subjected to surface fusion treatment. Then, optical connectors were attached to this laser guide optical fiber. When a YAG laser beam having a pulse frequency of 10 pps and a pulse width of 1 msec entered the laser guide optical fiber to the amount of 9.82 J, a laser output of 8.29 J was obtained from the light emitting surface.

Comparative Example 3

In Example 3, a laser guide optical fiber was formed with only the optical fiber body with no quartz chip provided, and the optical connectors were attached to this laser guide optical fiber. When a YAG laser beam having a pulse frequency of 10 pps and a pulse width of 1 msec entered the laser guide optical fiber to the amount of 1 J, the end surface on the light entering side of the laser guide optical fiber was broken.

INDUSTRIAL APPLICABILITY

The present invention is useful for laser guide optical fibers used for transmitting laser beams, and laser guides including the laser guide optical fibers.

The invention claimed is:

1. A laser guide optical fiber used for transmitting a laser beam, comprising:
    an optical fiber body including a core and a clad; and
    a quartz chip integrally provided at an end surface on a light entering side of the optical fiber body and including an optical waveguide portion, where at least the optical waveguide portion of the quartz chip is made of pure quartz,
    wherein the quartz chip includes a light entering surface subjected to surface fusion treatment.
2. The laser guide optical fiber of claim 1,
    wherein the optical fiber body is formed with a GI type optical fiber in which the core is made of quartz glass doped with germanium.
3. The laser guide optical fiber of claim 1,
    wherein the quartz chip is made of pure quartz glass only.
4. The laser guide optical fiber of claim 1,
    wherein the quartz chip is formed with an SI type optical fiber including a core made of pure quartz glass and having a core diameter larger than a core diameter of the optical fiber body.
5. The laser guide optical fiber of claim 1,
    wherein the optical fiber body further includes a support layer covering the clad.
6. A laser guide where a laser guide optical fiber is inserted through a flexible tube and optical connectors are attached to opposite ends of the laser guide optical fiber, wherein
    the laser guide optical fiber includes
    an optical fiber body including a core and a clad, and a quartz chip integrally provided at an end surface on a light entering side of the optical fiber body and including an optical waveguide portion, where at least the optical waveguide portion of the quartz chip is made of pure quartz, and the quartz chip includes a light entering surface subjected to surface fusion treatment.

7. The laser guide optical fiber of claim 2, wherein the quartz chip is made of pure quartz glass only.

8. The laser guide optical fiber of claim 2, wherein the quartz chip is formed with an SI type optical fiber including a core made of pure quartz glass and having a core diameter larger than a core diameter of the optical fiber body.

* * * * *